United States Patent
Dean et al.

(10) Patent No.: US 6,223,292 B1
(45) Date of Patent: Apr. 24, 2001

(54) AUTHORIZATION SYSTEMS, METHODS, AND COMPUTER PROGRAM PRODUCTS

(75) Inventors: Dawson F. Dean, Piedmont; Edward Yan-Bing Wang, Oakland; Ling Tony Chen, Cupertino; Anders Edgar Klemets; Navin Chaddha, both of Sunnyvale, all of CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/893,293

(22) Filed: Jul. 15, 1997

(51) Int. Cl.$^7$ .................. G06F 15/16; G06F 15/177; G06F 11/30; G06F 12/14
(52) U.S. Cl. .................. 713/202; 709/231; 709/217; 709/218; 709/219; 713/200; 713/201
(58) Field of Search .................. 395/188.01, 187, 395/200.61, 725, 200.33; 713/200, 201, 202, 203; 380/23, 25; 709/217, 218, 219, 220, 231

(56) References Cited

U.S. PATENT DOCUMENTS

| | | | |
|---|---|---|---|
| 4,731,841 | * | 3/1988 | Rosen et al. ............... 380/23 |
| 5,500,889 | * | 3/1996 | Baker et al. ............... 379/67 |
| 5,570,283 | * | 10/1996 | Shoolery et al. ............... 364/407 |
| 5,615,268 | * | 3/1997 | Bisbee et al. ............... 380/25 |
| 5,655,077 | * | 8/1997 | Jones et al. ............... 395/187.01 |
| 5,671,281 | * | 9/1997 | Campbell et al. ............... 380/25 |
| 5,737,419 | * | 4/1998 | Ganesan ............... 380/21 |
| 5,740,231 | * | 4/1998 | Cohen et al. ............... 379/89 |
| 5,778,187 | * | 7/1998 | Monteiro et al. ............... 395/200.61 |
| 5,802,162 | * | 9/1998 | Beltrano et al. ............... 379/242 |
| 5,835,726 | * | 11/1998 | Shwed et al. ............... 709/229 |
| 5,841,970 | * | 11/1998 | Tabuki ............... 713/201 |
| 5,940,074 | * | 8/1999 | Britt, Jr. et al. ............... 345/333 |
| 5,944,824 | * | 8/1999 | He ............... 713/201 |
| 5,990,927 | * | 11/1999 | Hendricks et al. ............... 348/6 |
| 6,002,394 | * | 12/1999 | Schein et al. ............... 345/327 |
| 6,006,333 | * | 12/1999 | Nielsen ............... 713/202 |
| 6,112,185 | * | 8/2000 | Walker et al. ............... 705/5 |

* cited by examiner

*Primary Examiner*—Thomas Lee
*Assistant Examiner*—Tanh Q. Nguyen
(74) *Attorney, Agent, or Firm*—Schwegman, Lundberg, Woessner & Kluth, P.A.

(57) ABSTRACT

Authorization methods, systems and computer program products ensure that user media streaming requests are implemented to access unmodified original content. Authorization and data collection follow a user streaming request to a media server, including comparison of user password with a remote password maintenance authority, followed by decryption and descrambling of content pursuant to password clearance. Streaming and media content recording are monitored to ensure compliance with bandwidth and stream number policies for all and specific clients. Users are provided with service levels at least at the level of predetermined status.

35 Claims, 10 Drawing Sheets

AUTHORIZATION SYSTEMS, METHODS, AND COMPUTER PROGRAM PRODUCTS

CROSS-REFERENCE TO RELATED APPLICATION

This application is related to an application having the title "AUTHENTICATION SYSTEMS, METHODS, AND COMPUTER PROGRAM PRODUCTS," and to same inventors, under U.S. Pat. No. 6,173,406, issued Jan. 9, 2001, the totality of which is hereby expressly incorporated herein and made a part hereof by reference.

TECHNICAL FIELD

The present invention relates to the transportation of data from a content node to a presentation node on a network, and particularly to the presentation of audio and video information on a selected network node which is derived from a content node and is presented at a user node with assistance from a media content server.

BACKGROUND OF THE INVENTION

Video or audio content is typically presented to a user on a web browser based upon content documents and pages received from a media server, e.g., a video or audio server. The web browser may contain, or receive by downloading, a plug-in which is configured to play real-time audio or real-time video (respectively "real audio" or "real video") in cooperation with streaming data from an external video or audio server. The video or audio plug-in is installed on a client machine and includes code which opens a predetermined window in the browser within which the video content is played and viewable.

Unfortunately, the content provider often has no control over the amount of content usage by a user nor over the replication of this content. Accordingly, there is a need to control content presentation and reproduction by unauthorized and unauthenticated users of content distributed over networks, including but not limited to the Internet.

In particular, there is a desire to ensure that content is protected from access by unauthorized users or from usage in excess of predetermined policies relating to degree of use.

SUMMARY OF THE INVENTION

According to one embodiment of the present invention, users are provided with graduated service level passwords for access to media streaming services provided by a media server. When the media server receives a streaming service request from a user as well as the user's prioritized password, the media server evaluates the user according to service level by parsing and analyzing the password. If the user password entitles the user to a low graduated service level, according to one embodiment of the present invention the user will nonetheless be provided with a higher level of service then a predetermined entitlement by prior arrangement actually permits, if the higher service level is available. If no higher service level is available, provide service at predetermined level. If after streaming is initiated to a low status user, a demand is made by a user for such higher service level, the low-status user service level is reset to conform to actual status entitlement. Service levels are graduated according to one embodiment of the present invention, in categories of bandwidth, frame rate, resolution, frame size, and audio fidelity levels.

According to the present invention, a media server is configured for communication with a remote data base which according to one embodiment is installed in a selected web server and which provides streaming authorization services and usage policy information with respect to stream and bandwidth quotas applicable to user access to selected media services from a particular media server based upon content volume rates (bandwidth) and well-formed (i.e., video or audio) streams, for example. According to one embodiment of the present invention, in response to a user request for presentation of a selected video streaming performance, the media server includes an interface configured for communication with a remote data base (in a selected web server, for example), i.e., a password authority, to determine whether the user is authorized, and whether the user is entitled within a predetermined bandwidth quota and/or a predetermined stream quota to receive the requested content substantially at the time requested. After receiving the request for streamed performance, the media server requests user identification and/or a password. The password, according to one embodiment of the present invention, is encrypted and provided to a server associated with the remote data base which carries applicable quota information and passwords. The remote server then responds, according to one embodiment of the present invention, with information regarding authorization of the user with respect to particular content bandwidth and stream. If a streaming performance is permitted, the media server indicates allowed performance, provides authorization to duplicate the performance (according to one embodiment of the present invention), and maintains an account of predetermined user events and characteristics quantifying usage, re-usage, pauses and replays of the performance. The user events and characteristics are then, according to one embodiment of the present invention, recorded and/or transmitted to a remote billing location which can be the same as the remote data base and associated web server which maintains the quotas, policies, and user access data, enabling the initial performance and reproduction.

DETAILED DESCRIPTION OF A PREFERRED EMBODIMENT

Figure 1A:
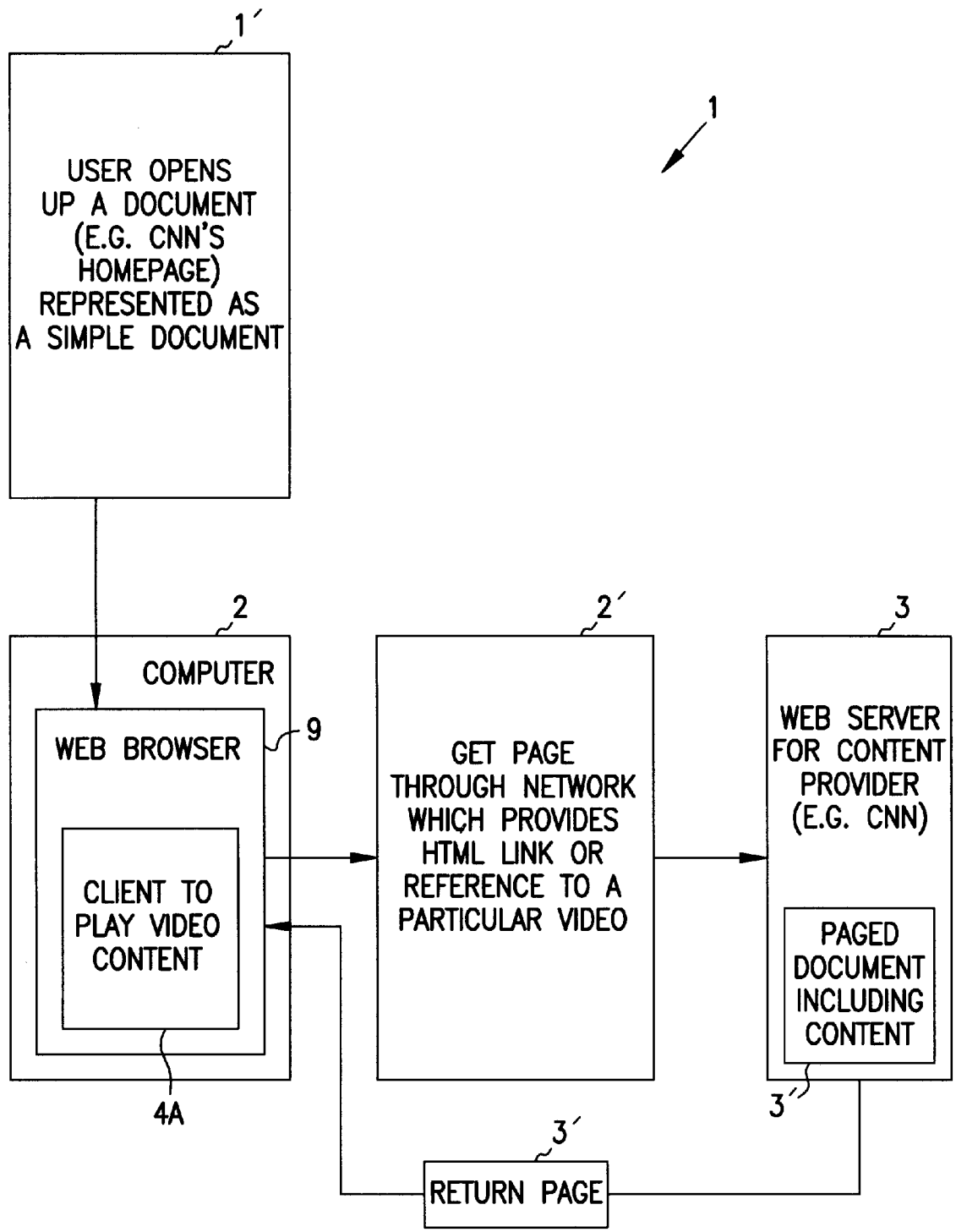
FIG. 1A is a block diagram of a computer network including a computer having installed therein a web server for a content provider.

FIG. 1A is a block diagram of a computer network 1 including a computer 2 and a web server 3. The web server 3 is used by a particular content provider, such as CNN for example, to broadcast selected content including but not limited to paged documents having video content to a wide range of clients and users. Computer 2 has a web browser 9 installed at a user node of the network 1. The web browser 4 is configured to include a client machine 4A connected to the web server 3. The client machine 4A is effective for playing or performing real-time video or audio content in association with an external video or audio server. The web browser 9 is a conventional browser provided by Netscape or Microsoft Explorer, for example. Client machine 4A enables the user to open up 1' a document received or downloaded from web server 3. The document received may be for example CNN's home page, and it may include predetermined elements or parts which have been linked together, such as tags, pictures, or video windows, for example. In operation, the user requests 2' certain content of interest, such as a particular page or document, and in response to the request, the web server provides the document specified including the uniform resource locator (URL) for the document. According to one embodiment of the present invention, the client machine 4A is configured to find the URL associated with the particular document, as will be discussed in detail below.

Figure 1B:
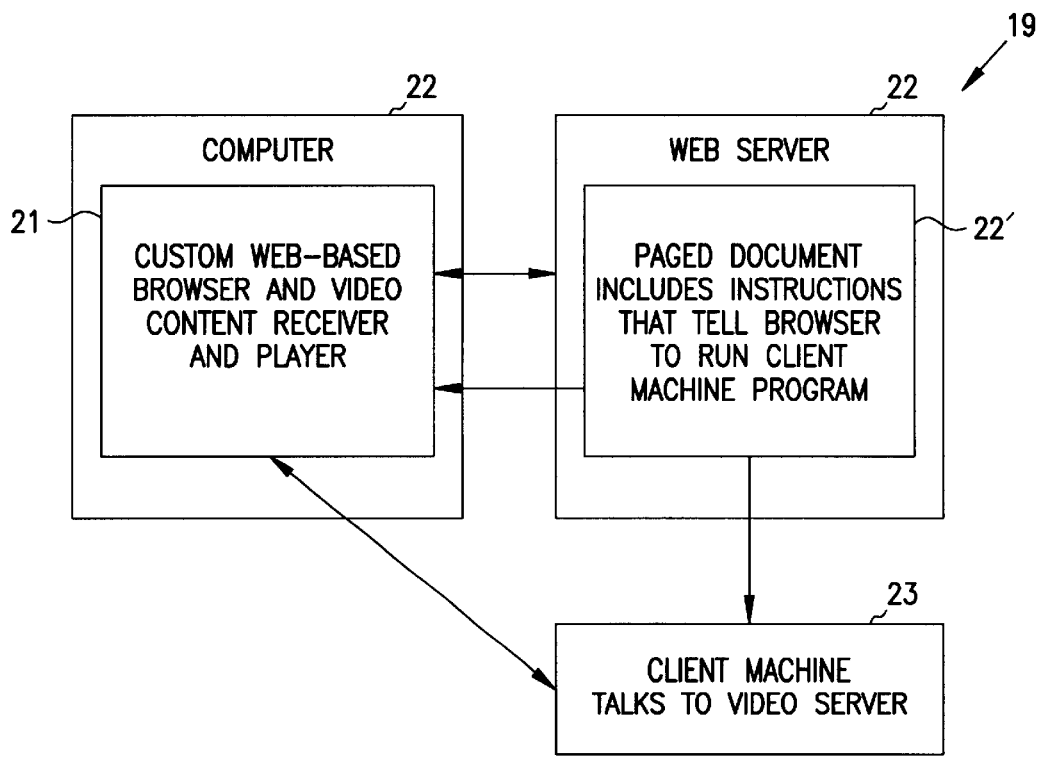
FIG. 1B is a block diagram of a computer network including a computer having installed therein a browser.

FIG. 1B is a block diagram of a computer network 19 including a computer 20 which has installed therein a browser 21. The computer network 19 further includes a web server 22 in networked communication (through a LAN, a WAN, the Internet, or another wired or wireless communication system) with computer 20 and browser 21. Web server 20 includes a source of distributable content which may include paged documents including video or audio content. Computer network 19 further includes a video media server 23 for example, which receives content from web server 22 and play requests from browser 21.

Figure 1C:
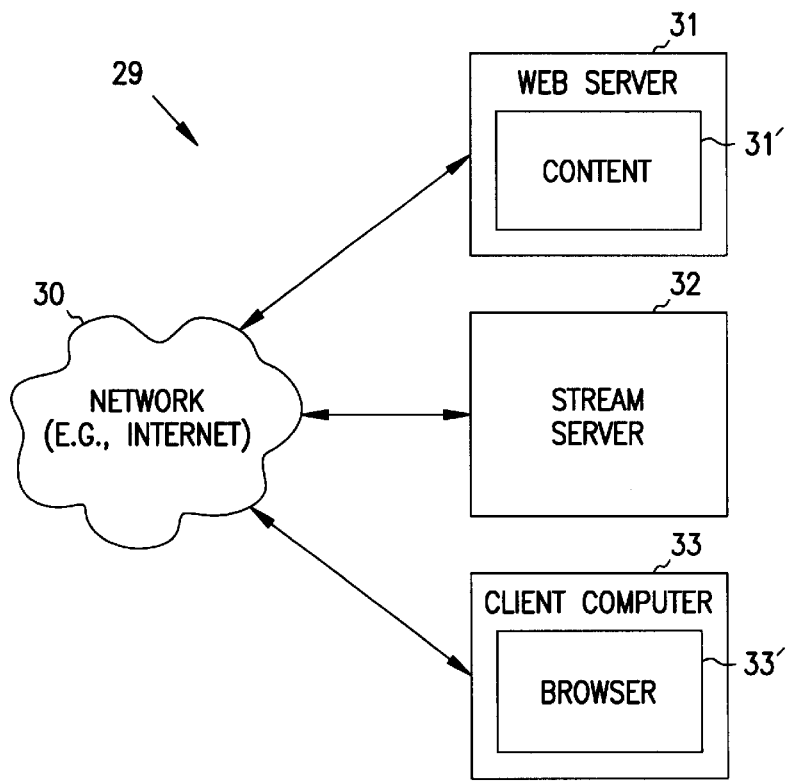
FIG. 1C is a block diagram of a computer according to the present invention.

FIG. 1C is a block diagram of a computer system 29 according to the present invention. In particular, the computer system 29 includes a network 30 such as the Internet, a web server 31 including content 31', a stream server 32 for enabling the playing of selected content originating from web server 31 and stream server 32, and a client computer 33 having a browser 33' for receiving selected content from web server 31 and controlling the substantially real-time presentation of selected content in communication with stream server 32.

Figure 1D:
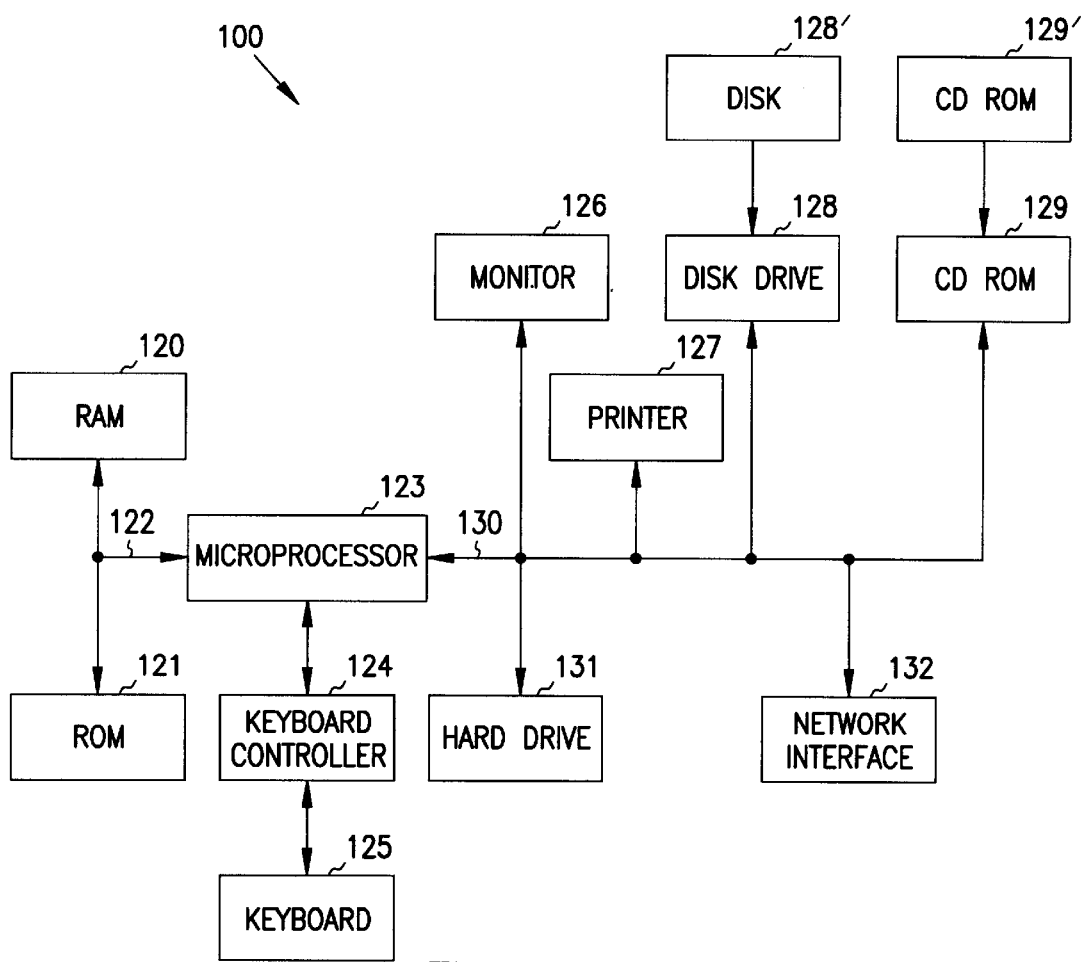
FIG. 1D is a block diagram of a computer system which can be used as a client computer for playing selected audio and video content in accordance with the present invention.

FIG. 1D is a block diagram of a computer system 100 which can be used as a client computer for playing selected audio and video content in accordance with the present invention. Computer system 100 includes random access memory (RAM) 120; read only memory (ROM) 121; a memory bus 122 connected to RAM 120 and ROM 121; a microprocessor 123 connected to the memory bus 122; a monitor 126; a printer 127; a disk drive 128; a compact disk read only memory (CD ROM) drive 129; a peripheral bus 130 connected to monitor 126, printer 127, disk drive 128, and CD ROM drive 129; a hard drive 131; and a network interface, each connected to peripheral bus 130 as shown in FIG. 1D. Disk drive 128 and CD ROM drive 129 are respectively able to read information including computer program products (not shown) which can be embedded on media such as, respectively, a magnetic or optical disk or floppy 128' and a CD ROM medium 129'. Depending upon the selected drive and medium, writing on the selected medium as well as reading can be accomplished.

Figure 1E:
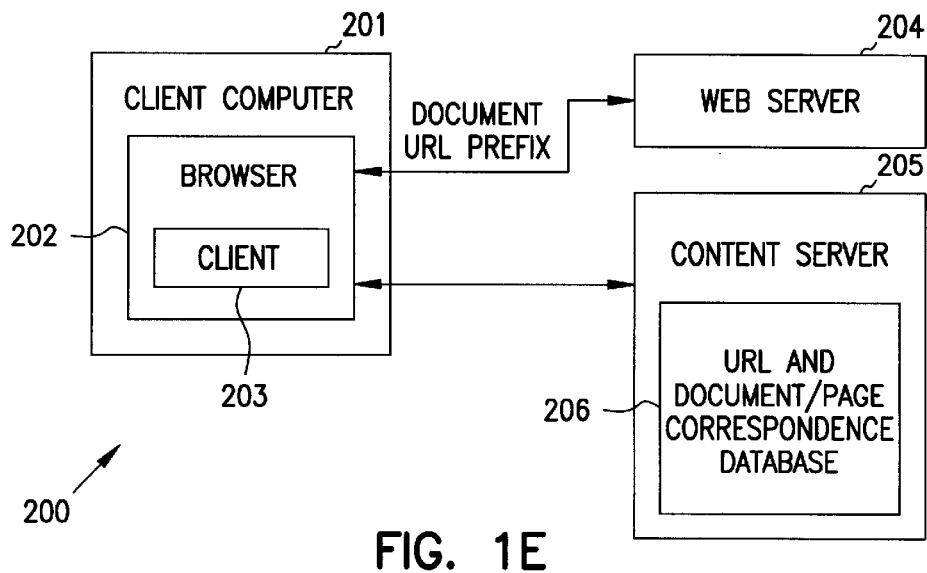
FIG. 1E is a block diagram of a content performance system (CPS) according to the present invention, which includes a client computer for user selected renderable content performances, which includes a browser and a client.

FIG. 1E is a block diagram of a content performance system (CPS) 200 according to the present invention, which includes a client computer 201 for user selected renderable content performances, which includes a web browser 202 and a plug-in client 203 plugged into web browser 202. CPS 200 further includes a web server 204 and a content (e.g., a video or an audio) server 205 having a data base including related URL and content components to specify which URLs are authorized for which content performances. To obtain the URL of a web page received from a web server, a plug-in client 203 operates for example with a Netscape Navigator web browser. The client program runs inside Navigator and displays its output inside the Navigator browser window. The plug-in client 203 is started by the browser when it displays a web page that contains a command to invoke the plug-in client 203. The plug-in client 203 then runs until the web browser 202 displays a different web page. According to one embodiment, the web browser 202 downloads a file from the web server 204 and feeds it as input to the plug-in client 203. There is a mechanism whereby the plug-in client 203 can ask the web browser 202 to download a selected file on its behalf. The plug-in client 203 can specify whether the browser should deliver the file little by little while it is still being downloaded, or if the web browser 202 should wait until the particular file is fully downloaded and only then give it to the plug-in client 203. Alternatively, a client 203 can contact a video server directly, without enlisting the help of the web browser. To determine the URL of the web page that launched the plug-in, the following steps are undertaken. A typical URL is in the form "http://server/path/file#anchor". The "#anchor" part is optional and tells the browser that it should search for a "tag" or "mark" called "anchor" in the document given by the URL "http://server/path/file". As is well-known, many web pages are written in a command language called HTML, which has support for anchor tags. The web browser 202 displays the document with the text that immediately follows the anchor tag at the top of the screen. A web document may refer to other documents or even to itself, using a shorthand form called a relative URL. It is sometimes useful to refer different parts within the current document. Such references are for example "#anchor1: or "anchor2", etc. This is a relative URL, with the file name part of the URL being omitted. Omitting the file name makes it possible to rename the HTML file without having to update the URLs that refer to the file. According to one embodiment of the present invention in which the client machine is launched by Netscape Navigator version 3.0, the client asks the web browser 202 to deliver the URL "#". Since the left hand side of "#" is empty, it means "the current document, whatever its name might be". Leaving the right hand side of "#" empty means "no particular anchor". In addition, the client asks the web browser 202 to deliver the file only when it has been fully downloaded. When the file has been fully downloaded, the web browser 202 invokes a function in the plug-in client 203 which is part of the Netscape plug-in API. One of the parameters to this function is a data structure that contains the complete URL of the current document. If the plug-in client 203 detects that the browser is Netscape Navigator 4.0, it asks the web browser 202 to deliver the following URL: "javascript:document.URL". The "javascript:" part tells the web browser 202 that what follows on the right hand side of the colon is a command in the JavaScript language. The web browser 202 has a built in JavaScript interpreter. The "document.URL" command returns a text file with the URL of the current document. This text file is delivered to the plug-in client 203. The plug-in client 203 then just reads the file and extracts the URL of the current document from it.

Figure 1F:
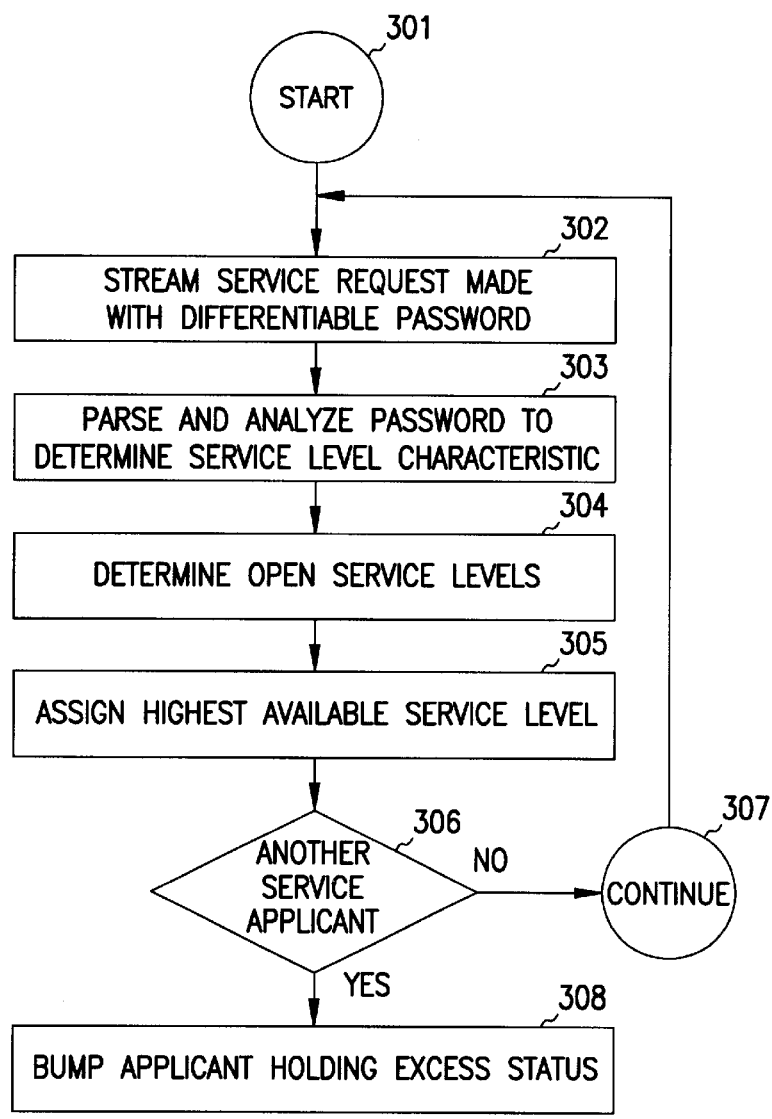
FIG. 1F is a flow chart of a password method 300 according to the present invention.

FIG. 1F is a flow chart of a password method 300 according to the present invention. In particular, the process starts 301 with a browser user making a stream service request with a service differentiable password. According to the present invention, passwords having predetermined different service value levels are assigned to particular users. When a user makes a service request and provides a password to a media server able to provide stream services, the media server parses and analyses 303 the password to determine its corresponding service level. The identified service level is the minimum service which is to be provided to a user carrying the particular password service level. A check is accordingly made, to determine the existence of particular service levels, i.e., which service levels are currently available 304. The user is according to the present invention assigned the highest available service level. Next, according to the present invention, another service applicant communicates 306 with a media server to obtain a pre-established service level which may be higher than the service level to which the user has applied. If there is no service applicant, the system continues 307 and the password processing continues according to the present invention. If there is another higher service level applicant, the lower service level user is bumped.

Figure 2:
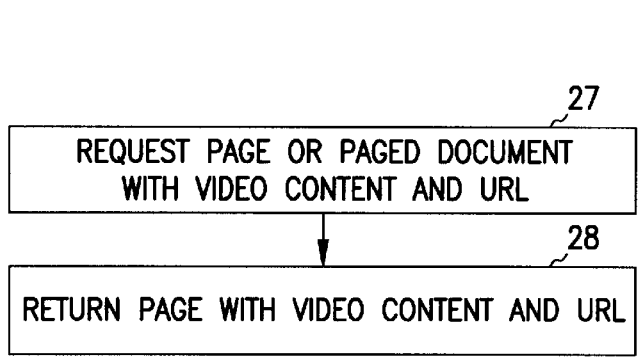
FIG. 2 is a flow chart of a method according to the present invention in which a user acting through a browser requests content, e.g., without limitation, a page or a paged document, including a media content link provided to the browser with a universal resource locator (URL) code associated with the provided content.

FIG. 2 is a flow chart of a method 26 according to the present invention in which a user acting through a browser requests particular content, e.g., without limitation, a page or a paged document linked with video content be provided to the browser, with a universal resource locator (URL) code being associated with the provided content. In particular, the method according to one embodiment of the present invention includes requesting 27 a page or paged document indicating desired video content as well as a content-associated URL. Further, the method includes returning 28 a requested page with video content link and an associated URL.

Figure 3A:
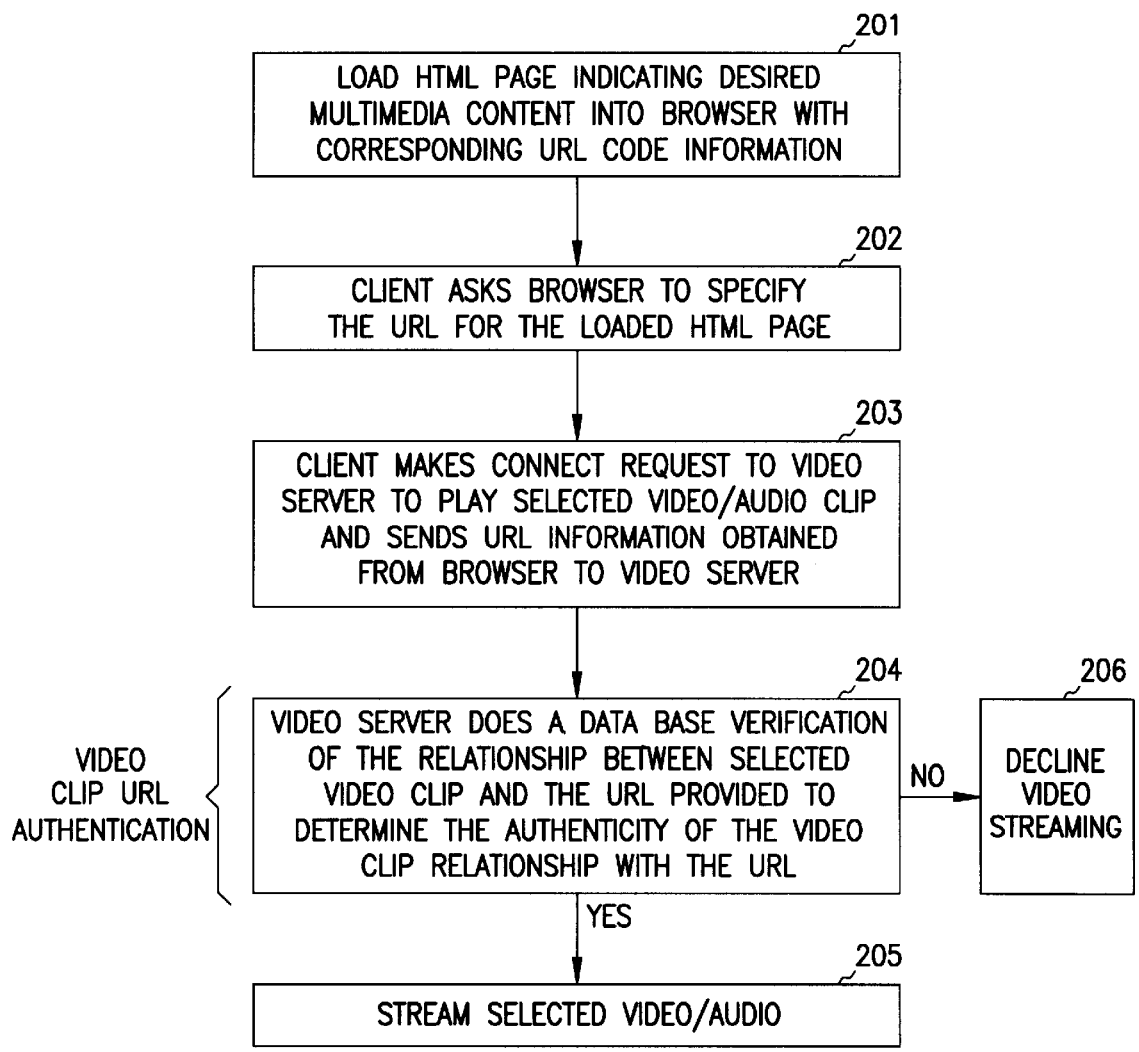
FIG. 3A is a flow chart of an authentication method according to one embodiment of the present invention, to determine whether the URL and the content provided for presentation represent an authorized combination.

FIG. 3A is a flow chart of an authentication method according to one embodiment of the present invention. The authentication method enables determination of whether the URL and the content provided for presentation represent an authorized combination. In particular, an HTML page indicating particular desired multimedia content is loaded 201 by a user into a selected browser. A plug-in client operable with the browser is either pre-installed or currently loaded or plugged into the browser for cooperative media playing and presentation activities. The client machine asks 202, according to the present invention, the browser to specify the URL applicable for the loaded HTML page. The client machine then makes a request 203 of a selected multimedia server (e.g., video server) to play the desired multimedia content (such as, for example, a selected video or audio clip or other content) and sends to the multimedia or content server the URL it has received from the browser. The video server consequently does a data base verification 204 of the relationship between the selected video clip or other multimedia content and the provided URL to determine the authenticity of the video clip relationships with the URL. If authentication is successful, the selected video, audio, or other multimedia content is streamed at a substantially real-time rate.

Figure 3B:
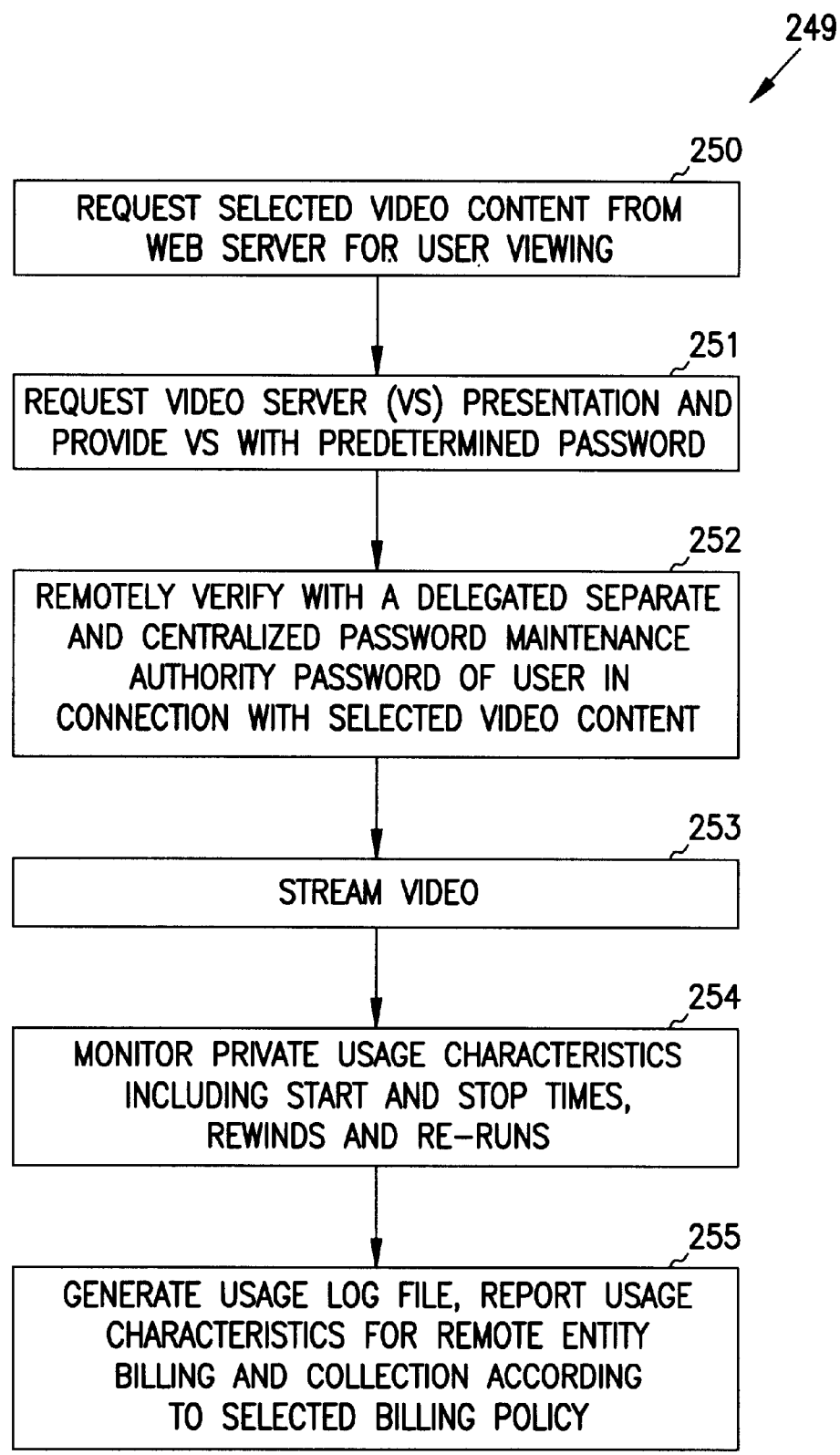
FIG. 3B is a flow chart of an authentication method according to one embodiment of the present invention.

FIG. 3B is a flow chart of an authentication method 249 according to one embodiment of the present invention. In particular, method 249 includes requesting 250 selected video or audio content from a particular web server to enable user viewing. The requested content is provided to a user (i.e., client) computer through the Internet, for example, to enable local playing and presentation of the desired content. To enable playing, a video or audio server is provided 251 with a request to stream the requested audio or video or combination thereof, and with a user password as well. Upon receipt of the stream request and the user password, the video/audio server undertakes to verify 252 the fact and degree of usage authorization of the user (based upon password) with respect to the identified content sought to be streamed and played. According to another embodiment of the present invention, the authorization, i.e., authentication determination is made locally at the video server. According to one embodiment of the present invention, the determination is made remotely with a predetermined authentication authority by communication with a remote designated or designable server addressed or connected through a selected network or other communications system or medium or combination thereof. In particular, password authorization can be accomplished by reference to a predetermined, centralized password maintenance authority. This is advantageous because only a single master password list or authority needs to be established and maintained, and the confusion of having multiple password lists is thereby eliminated. Once the password has been authorized in connection with selected content to be played, streaming of the content (e.g., video) is initiated 253. Further, according to the present invention, the user's private usage characteristics are monitored 254. Such usage characteristics may include recording start and stop times for video streaming, and recording rewind and rerun events. Finally, a log file or report is generated 255 based upon usage of streamed data, to enable billing to be accomplished as well as collection of amounts owing, in accordance with predetermined billing and collection policies. According to one embodiment of the present invention, billing and collection is undertaken by the content proprietor, licensee, or agent. According to another embodiment, billing is performed by the streaming authority.

Figure 4:
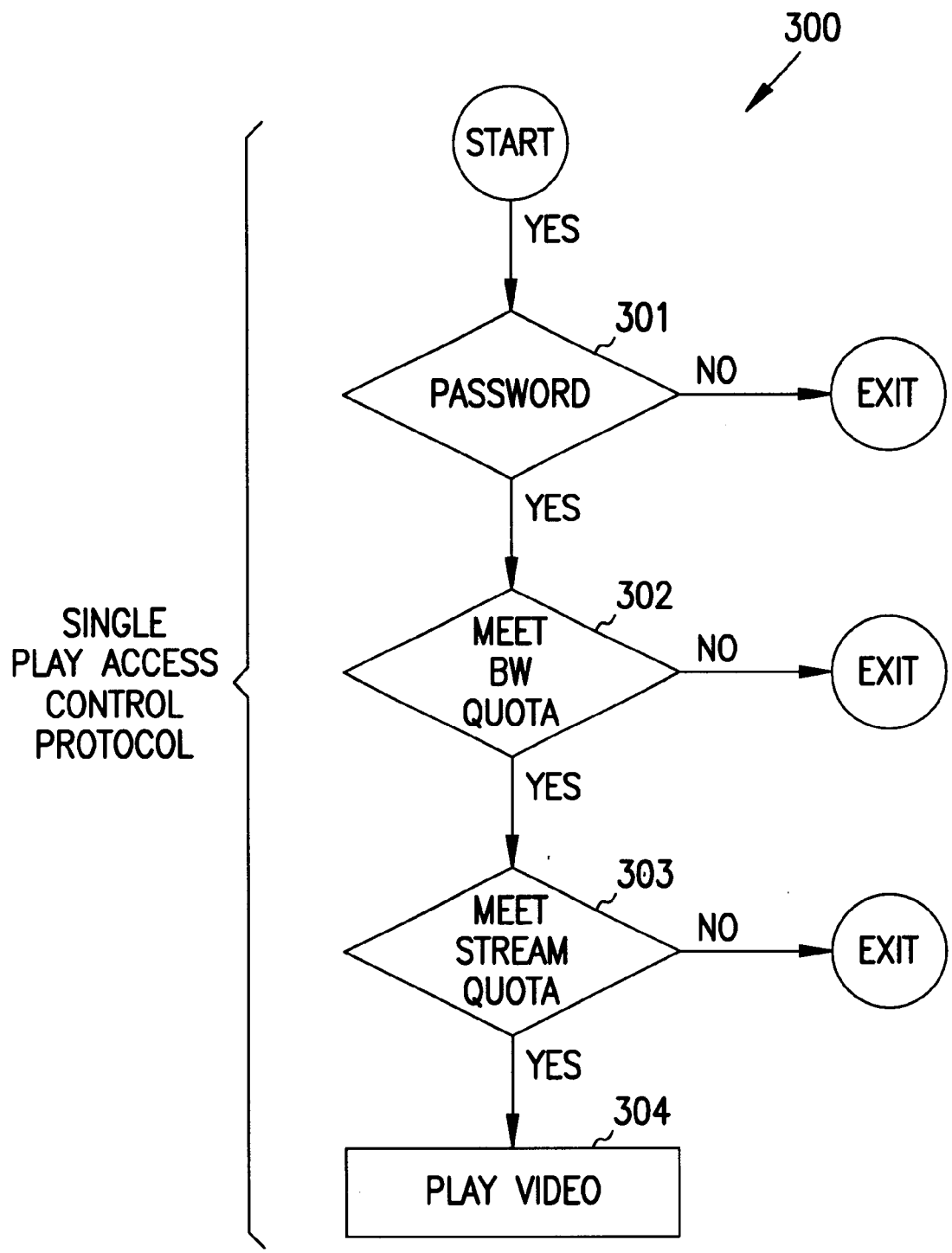
FIG. 4 is a flow chart of a user authentication protocol according to the present invention, which comprises a stream quota, a bandwidth quota, and a password authentication component.

FIG. 4 is a flow chart of a user authentication protocol 300 according to the present invention, which comprises a stream quota, a bandwidth quota, and a password authentication component. In particular, the user authentication protocol 300 includes checking 301 the validity of a password provided to a stream server by a client, either locally or remotely. If password authentication is successfully achieved with respect to selected content, then a check is made 302 to determine whether the requested performance or play action with respect to the selected content meets or exceeds the bandwidth (BW) policy of the stream server or the client user. The BW policy is a data rate quota established for a stream server or a client user. Additionally, a check is made 303 to determine whether the requested performance or play action with respect to the selected content meets or exceeds the stream quota of the stream server or the client user. The stream quota is a measure of the number of video or audio streams allotted to a particular stream server or client user. If the bandwidth, stream, and password requirements have been successfully traversed, streaming of the selected video or audio content is initiated and completed under user control or according to user requirements. If one of the indicated requirements is not met, streaming operation is barred or terminated. According to the present invention, the password authorization determination is made remotely of the content server in conjunction with or at a centralized password authority server. According to the present invention, the bandwidth and stream quota determinations are made locally by the video server, as a form of self control of workload and job allocation determination. According to one embodiment, the password is DES encrypted and accordingly decrypted prior to evaluation.

Figure 5:
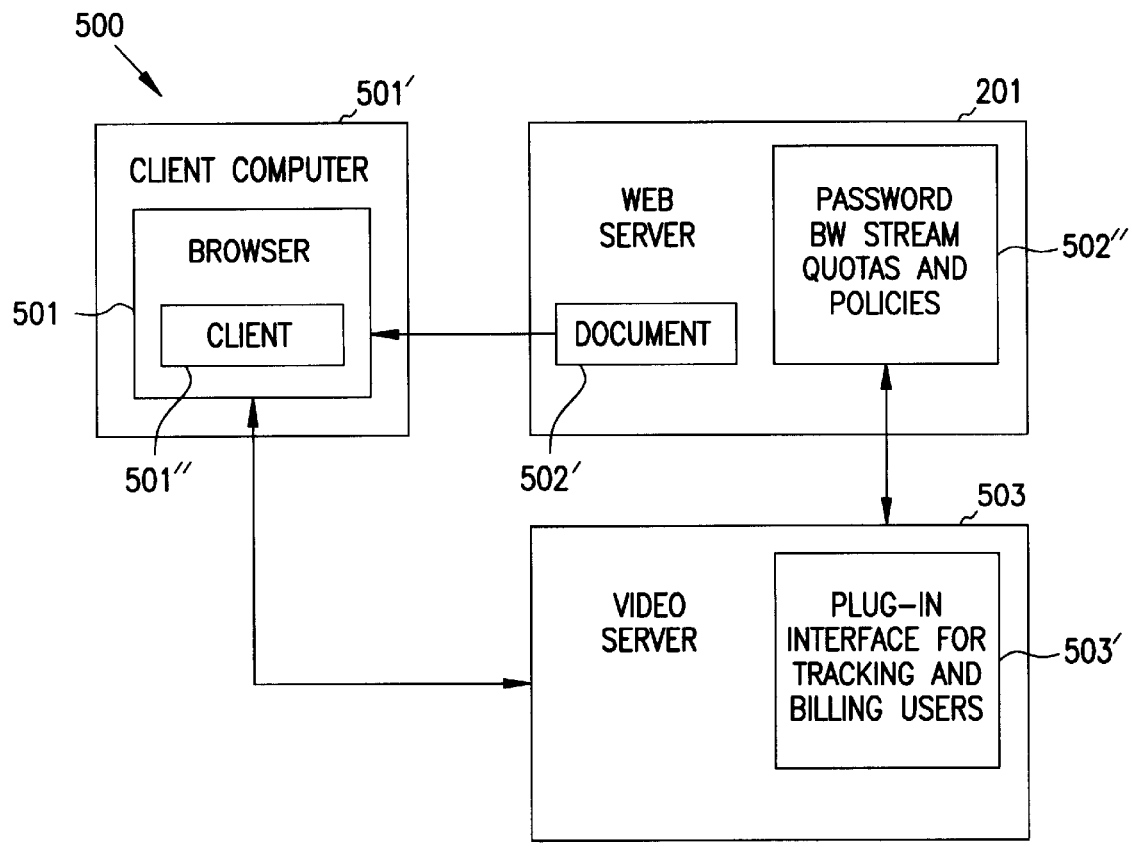
FIG. 5 is a block diagram of a computer system according to the present invention.

FIG. 5 is a block diagram of a computer system 500 according to the present invention. In particular, the computer system 500 includes a client computer 501 including a browser 501' in turn including a client 501" which is plugged into the browser 501'. Computer system 500 further includes a web server 502 including a content data base 502' including documents, for example, and including a policy data base 502" containing at least one of (1) passwords relating to particular content or groups of content in content data base 502', (2) a bandwidth quota or policy for establishing a limit of data quantity over time (i.e., bits/second) permitted for a particular password, a particular user, and/or a particular video server, and (3) a stream quota or policy for establishing a limit of number of audio or video streams which are permitted for a particular password, a particular user, and/or a particular video server. Computer system 500 further includes a video server 503 including an interface 503' plugged in or integrated with video server 503, for enabling and facilitating communication with web server 502 to accomplish desired and predetermined authentication activities as well as, for example, user information tracking and billing services, which activities are performed, according to one embodiment of the present invention, by the web server 502 and, according to another embodiment by the video server in communication with the web server 502.

Figure 6:
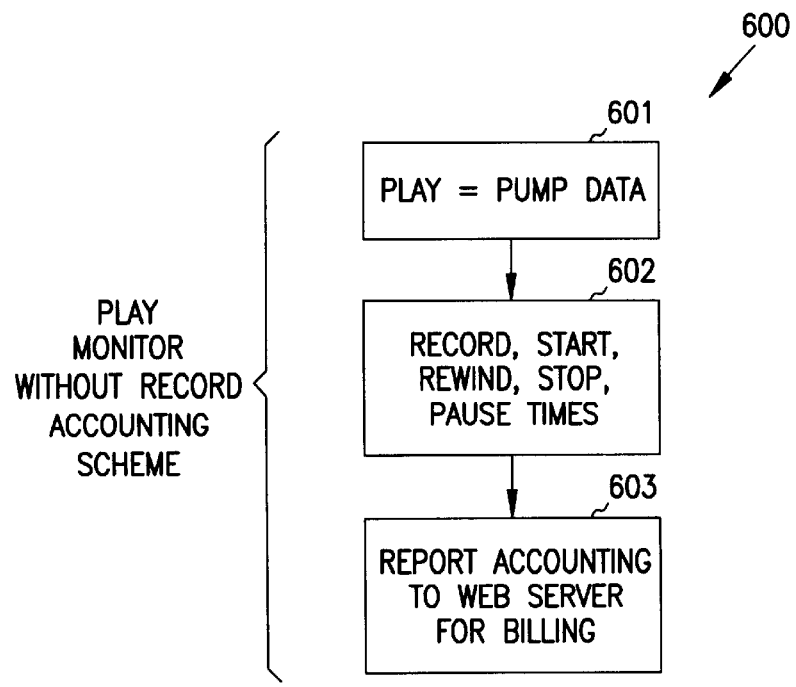
FIG. 6 is a flow chart of operation of a computer system according to one embodiment of the present invention.

FIG. 6 is a flow chart of operation of a computer system 600 according to one embodiment of the present invention. In particular, a video server plays, pumps or streams 601 data to a client computer which thereby receives a selected or requested work or clip for video or audio streaming performance. The computer system 600 according to the present invention monitors the video server streaming activity and records 602, for each user and each stream, the applicable activities performed or performable by a client computer, including any recording of performance activities, and each discrete start, stop, pause, rewind and play event or process. The recorded information or selected parts thereof are subsequently repeated 601 for accounting, pay per view processing by a separate server, which, according to one embodiment of the present invention.

Figure 7:
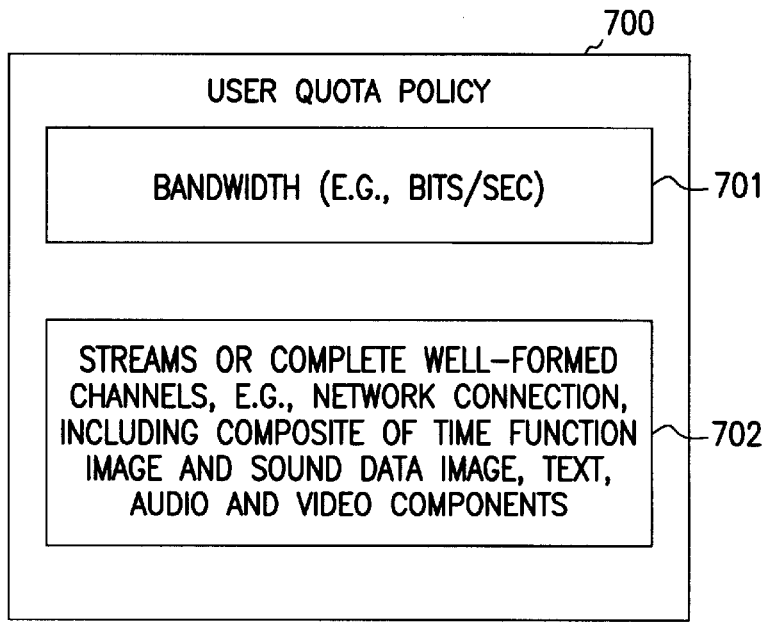
FIG. 7 is a block diagram of a user quota policy according to the present invention.

FIG. 7 is a block diagram of a user quota policy 700 according to the present invention. In particular, a user quota policy 700 includes at least one of first and second policies 701 and 702, respectively a user bandwidth policy 701 which may be expressed in terms of bits per second, and a stream policy 702 which is expressed in terms of allowed user streams or complete well-formed channels, e.g., network connections including, for example, a composite time function of image and sound data, text, audio and video components.

Figure 8:
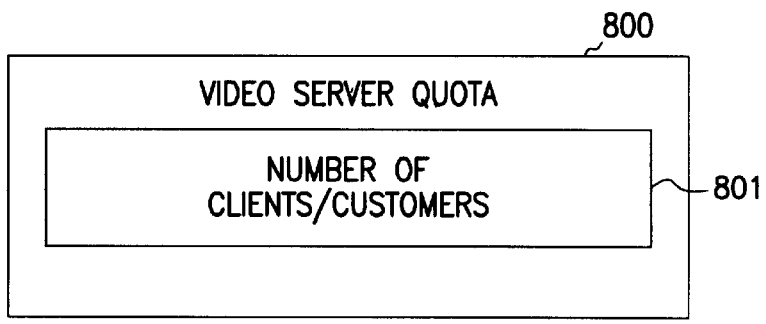
FIG. 8 is a block diagram of a video server quota policy according to the present invention, which includes a specified number of clients or customers.

FIG. 8 is a block diagram of a video server quota policy 800 according to the present invention, which includes a specified number of clients or customers 801. In particular, a video server unit is installed to serve a predetermined number of clients, as a result of information based upon the capacity of the video server.

Figure 9:
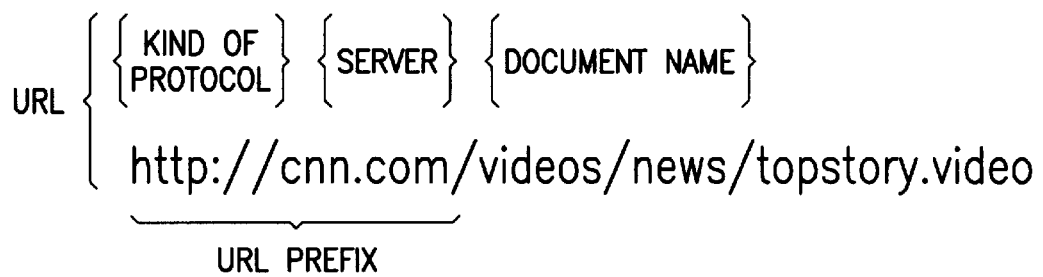
FIG. 9 is a diagram of the components of a uniform resource location (URL) designation which includes a URL prefix which establishes a particular kind of protocol and the server identified by the URL.

FIG. 9 is a diagram of the components of a uniform resource location (URL) designation which includes a URL prefix which establishes a particular kind of protocol and the server identified by the URL. The URL suffix which follows the URL prefix is a document name including a path to the particular document, e.g. video, which has been selected for viewing or presentation in a browser window, for example.

Figure 10:
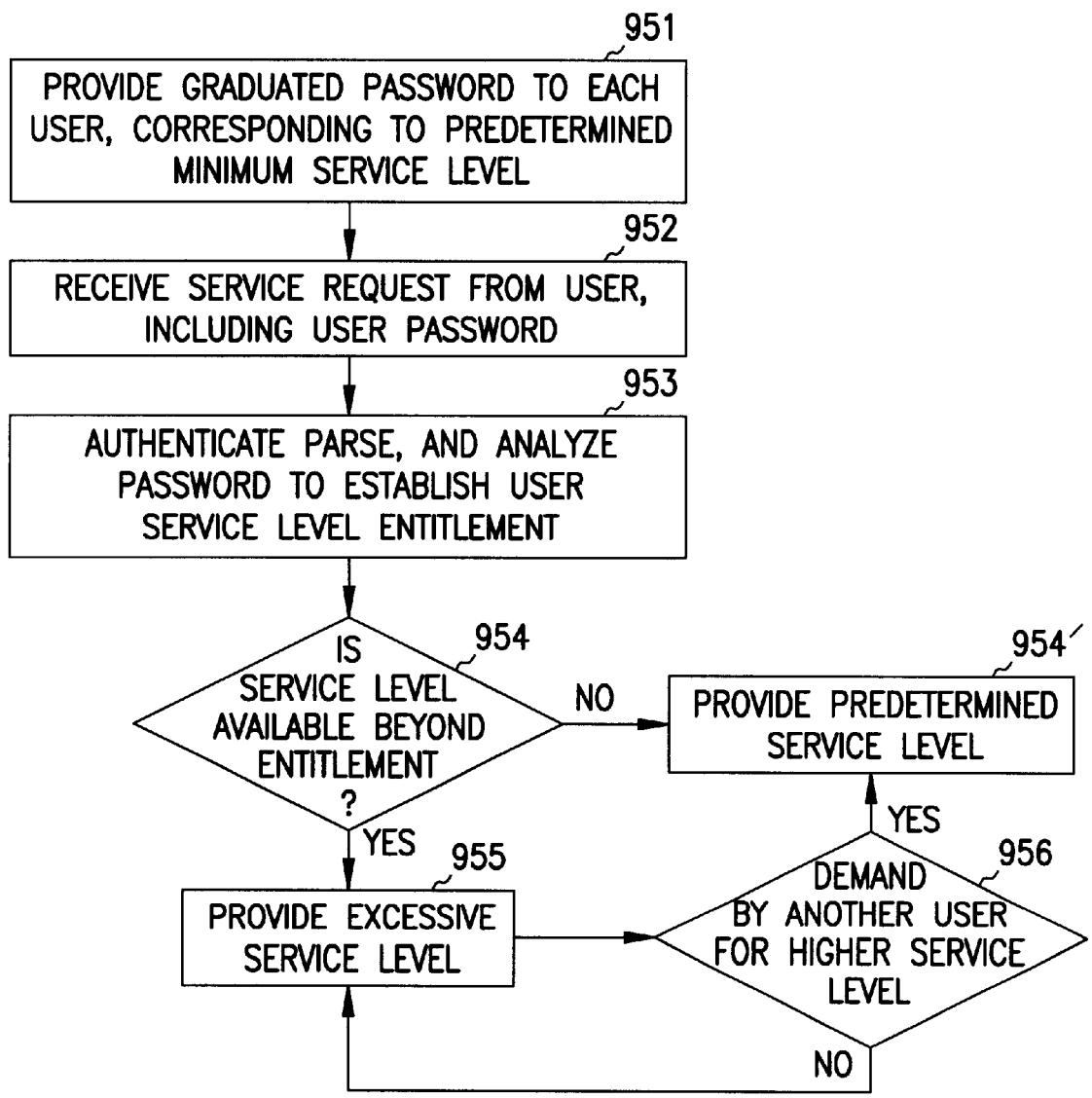
FIG. 10 is a flowchart of operation according to the present invention.

FIG. 10 is a flowchart of operation according to the present invention where according to one embodiment of the present invention, users are provided 951 with graduated service level passwords for access to media streaming services provided by a media server. When the media server receives 951 a streaming service request from a user as well as the user's prioritized password, the media server authenticates 952 the user according to service level by parsing and analyzing the password. If the user password entitles 953 the user to a low graduated service level, according to one embodiment of the present invention the user will nonetheless be provided 954 with a higher level of service then a predetermined entitlement by prior arrangement actually permits, if the higher service level is available 955. If no higher service level is available, provide service 954' at predetermined level. If after streaming is initiated to a low status user, a demand is made 956 by a user for such higher service level, the low-status user service level is reset 957 to conform to actual status entitlement. Service levels are graduated according to one embodiment of the present invention, in categories of bandwidth, frame rate, resolution, frame size, and audio fidelity levels. A password may for example be one byte, e.g., eight bits long. The last bit of the byte can be used as an indicator of service level to be provided to the user. According to one embodiment, the media server receives the password in DES encrypted form. Accordingly, upon receipt, the media server decrypts the password and then parses the password to isolate the last bit to evaluate service level, and then the media server provides the bandwidth or fidelity level, is applicable.

What is claimed is:

1. A method for authenticating a user requesting a media streaming performance with a server, said user having a password, said method comprising:

receiving, by the server, said password for said user;

transmitting, by the server, said password to a remote password authentication authority, wherein the remote password authentication authority authenticates said user based on said password;

receiving, by the server, a password authentication notice for said user from the remote password authentication authority;

determining a media streaming performance service level for said user from among a number of different media streaming performance service levels based on said password of said user; and determining if a higher media streaming performance service level than the media streaming performance service level for said user is available.

2. The method according to claim 1, further comprising decrypting streaming data received pursuant to password authentication.

3. The method according to claim 1, further comprising descrambling streaming data received pursuant to password authentication.

4. The method according to claim 1, further comprising providing password notice to the user upon determining a bandwidth quota has been satisfied.

5. The method according to claim 1, further comprising providing password notice to the user upon determining a stream quota has been satisfied.

6. The method according to claim 1, further comprising transmitting a user password to a media server having media content configured for streaming presentation in a presentation window associated with a web browser.

7. The method according to claim 1, further comprising transmitting the password which has been encrypted.

8. A method of providing secure multimedia services from a media server receiving a streaming request from a user having a password belonging to a group of passwords associated with a number of different media streaming performance service levels, said method comprising:

receiving a user stream request and the password from a user;

evaluating the password to identify whether to comply with the user stream request and to determine a media streaming performance service level for the user from among the number of different media streaming performance levels based on the password; and determining if a higher media streaming performance service level than the media streaming performance service level for said user is available.

9. The method according to claim 8, including providing the user with a higher media streaming performance service level than the media streaming performance service level established by the password.

10. The method according to claim 8, including providing the user with media streaming performance services corresponding to a predetermined number of well-formed channels.

11. The method according to claim 8, wherein the number of different media streaming performance service levels correspond to a number of different bandwidths.

12. The method according to claim 8, wherein the number of different media streaming performance service levels correspond to a number of different frame rates.

13. The method according to claim 8, wherein the number of different media streaming performance service levels correspond to a number of different resolutions.

14. The method according to claim 8, wherein the number of different media streaming performance service levels correspond to a number of different frame sizes.

15. A method of providing secure multimedia services from a media server receiving a streaming request from a user having a password belonging to a group of passwords associated with different media streaming performance service levels, said method comprising:

receiving a user stream request and the password from the user;

evaluating the password to identify whether to comply with the user stream request and to determine a media streaming performance service level for the user from among the number of different media streaming performance service levels, wherein the media streaming performance service level is higher than a predetermined entitlement associated with the password.

16. A method of providing secure multimedia services from a media server receiving a streaming request from a first user having a password belonging to a group of passwords associated with different service levels, said method comprising:

receiving a first user stream request and the password from the first user;

evaluating the password to identifying whether to comply with the first user stream request and to determine a service level for the first user from among the number of different service levels, wherein the service level is higher than a predetermined entitlement associated with the password; and resetting the service level for the first user to a lower service level in response to a second user requesting multimedia services from the media server, wherein the second user has a higher status than the first user.

17. The method of claim 1, further comprising changing the media streaming performance service level for said user to the higher media streaming performance service level upon determining the higher media streaming performance service level is available.

18. The method of claim 17, further comprising resetting the media streaming performance service level for said user to a lower media streaming performance service level in response to another user requesting multimedia services from the server, wherein the another user has a higher status than said user.

19. The method of claim 8, further comprising resetting the media streaming performance service level for said user to a lower media streaming performance service level in response to another user requesting multimedia services from the server, wherein the another user has a higher status than said user.

20. A computer-readable medium having computer-executable instructions for authenticating a user requesting a media streaming performance with a server, said user having a password, the instructions, causing a computer to implement a method comprising:

receiving, by the server, said password from said user;

transmitting, by the server, said password to a remote password authentication authority, wherein the remote password authentication authority authenticates said user based on said password;

receiving, by the server, a password authentication notice for said user from the remote password authentication authority;

determining a media streaming performance service level for said user from among a number of different media streaming performance service levels based on said password of said user; and determining if a higher media streaming performance service level than the media streaming performance service level for said user is available.

21. The computer-readable medium of claim 20, wherein the method further comprises changing the media streaming performance service level for said user to the higher media streaming performance service level upon determining the higher media streaming performance service level is available.

22. The computer-readable medium of claim 20, wherein the method further comprises resetting the media streaming performance service level for said user to a lower media streaming performance service level in response to another user requesting multimedia services from the server, wherein the another user has a higher status than said user.

23. The computer-readable medium of claim 20, wherein the method further comprises providing the user with media streaming performance services corresponding to a predetermined number of well-formed channels.

24. The computer-readable medium of claim 20, wherein the number of different media streaming performance service levels correspond to a number of different bandwidths.

25. The computer-readable medium of claim 20, wherein the number of different media streaming performance service levels correspond to a number of different frame rates.

26. A computer-readable medium having computer-executable instructions causing a computer to implement a method comprising;
   receiving a user stream request and a password from a user; and
   evaluating the password to identify whether to comply with the user stream request and to determine a media streaming performance service level for the user from among the number of different media streaming performance service levels based on the password; and
   determining if a higher media streaming performance service level than the media streaming performance service level for said user is available.

27. The computer-readable medium of claim 26, wherein the method further comprises changing the media streaming performance service level for said user to the higher media streaming performance service level upon determining the higher media streaming performance service level is available.

28. The computer-readable medium of claim 26, wherein the method further comprises resetting the media streaming performance service level for said user to a lower media streaming performance service level in response to another user requesting multimedia services from a server, wherein the another user has a higher status than said user.

29. The method of claim 16, wherein the number of different service levels correspond to a number of different frame rates.

30. The method of claim 16, wherein the number of different service levels correspond to a number of different resolutions.

31. The method of claim 16, wherein the number of different service levels correspond to a number of different frame sizes.

32. A computer-readable medium having computer-executable instructions providing secure multimedia services from a media server receiving a streaming request from a first user having a password belonging to a group of passwords associated with different service levels, the instructions, causing a computer to implement a method comprising:
   receiving a first user stream request and the password from the first user;
   evaluating the password to identify whether to comply with the first user stream request and to determine a service level for the first user from among the number of different service levels, wherein the service level is higher than a predetermined entitlement associated with the password; and
   resetting the service level for the first user to a lower service level in response to a second user requesting multimedia services from the media server, wherein the second user has a higher status than the first user.

33. The computer-readable medium of claim 32, wherein the method further comprises providing the user with streaming services corresponding to a predetermined number of well-formed channels.

34. The computer-readable medium of claim 32, wherein the number of different service levels correspond to a number of different resolutions.

35. The computer-readable medium of claim 32, wherein the number of different service levels correspond to a number of different frame sizes.

* * * * *